US008099788B2

(12) United States Patent
Munday

(10) Patent No.: US 8,099,788 B2
(45) Date of Patent: Jan. 17, 2012

(54) DECLARATIVE DATA SECURITY FOR A RAPID APPLICATION DEVELOPMENT TOOL COMPONENT

(75) Inventor: Terence Munday, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 648 days.

(21) Appl. No.: 12/211,797

(22) Filed: Sep. 16, 2008

(65) Prior Publication Data

US 2010/0070763 A1 Mar. 18, 2010

(51) Int. Cl.
*G06F 12/14* (2006.01)
(52) U.S. Cl. .......................... 726/27; 717/117; 713/167
(58) Field of Classification Search ................. 713/167; 726/27; 717/117
See application file for complete search history.

(56) References Cited

U.S. PATENT DOCUMENTS

| 5,764,241 | A  | * | 6/1998  | Elliott et al. | 345/473 |
| 6,988,109 | B2 | * | 1/2006  | Stanley et al. | 1/1 |
| 7,089,584 | B1 | * | 8/2006  | Sharma | 726/4 |
| 7,895,409 | B2 | * | 2/2011  | Mendonca | 726/4 |
| 2003/0058277 | A1 | * | 3/2003 | Bowman-Amuah | 345/765 |
| 2003/0093575 | A1 | * | 5/2003 | Upton | 709/310 |
| 2003/0233631 | A1 | * | 12/2003 | Curry et al. | 717/100 |
| 2004/0181775 | A1 | * | 9/2004 | Anonsen et al. | 717/104 |
| 2005/0216421 | A1 | * | 9/2005 | Barry et al. | 705/64 |
| 2006/0136479 | A1 | * | 6/2006 | Fan et al. | 707/102 |
| 2008/0172727 | A1 | * | 7/2008 | Cheng et al. | 726/7 |
| 2008/0270980 | A1 | * | 10/2008 | Ahadian et al. | 717/109 |
| 2009/0007269 | A1 | * | 1/2009 | Bianco | 726/25 |

OTHER PUBLICATIONS

Akel, Laura; Oracle ADF 11g Primer—Introduction to the building blocks of a Fusion Web application; An Oracle White Paper; Apr. 2007; pp. 1-12.

* cited by examiner

*Primary Examiner* — Matthew Smithers
(74) *Attorney, Agent, or Firm* — Kilpatrick Townsend & Stockton, LLP

(57) ABSTRACT

A security privilege view object instance. The security privilege view object instance provides security at the view object instance level, permitting multiple application modules to utilize a single entity object with different data privileges. In an embodiment, a view object implementation method is overridden to add selected security filters at instantiation of a view object instance.

18 Claims, 6 Drawing Sheets

DECLARATIVE DATA SECURITY FOR A RAPID APPLICATION DEVELOPMENT TOOL COMPONENT

BACKGROUND OF THE INVENTION

Data security is important, especially in an enterprise environment. For example, a large corporation may store information about its employees that the corporation and/or the employee may want to keep confidential. However, some managers may need access to subsets of the data for managerial tasks.

Often, data is stored in a database with relational attributes. For example, all information about a particular employee may be arranged in one row of a table or may otherwise be associated with an employee. For some applications, data regarding an entity, such as an employee, may be persisted as an object for data access. Often, a user, such as a manager, accessing information in the object may have limited clearance to view only a subset of information in the object. The manager may also have access to a limited number of objects. Thus, applying security at the data object level may be insufficient.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description of some embodiments that are presented later.

In accordance with an embodiment, a security privilege view object instance is provided. The security privilege view object instance provides security at the view object instance level, permitting multiple view object instances to utilize a single view object, with each view object instance having a different data privilege.

In an embodiment, a view object implementation method is overridden to add selected security filters at instantiation of a view object instance.

Other features of the invention will become apparent from the following detailed description when taken in conjunction with the drawings, in which:

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
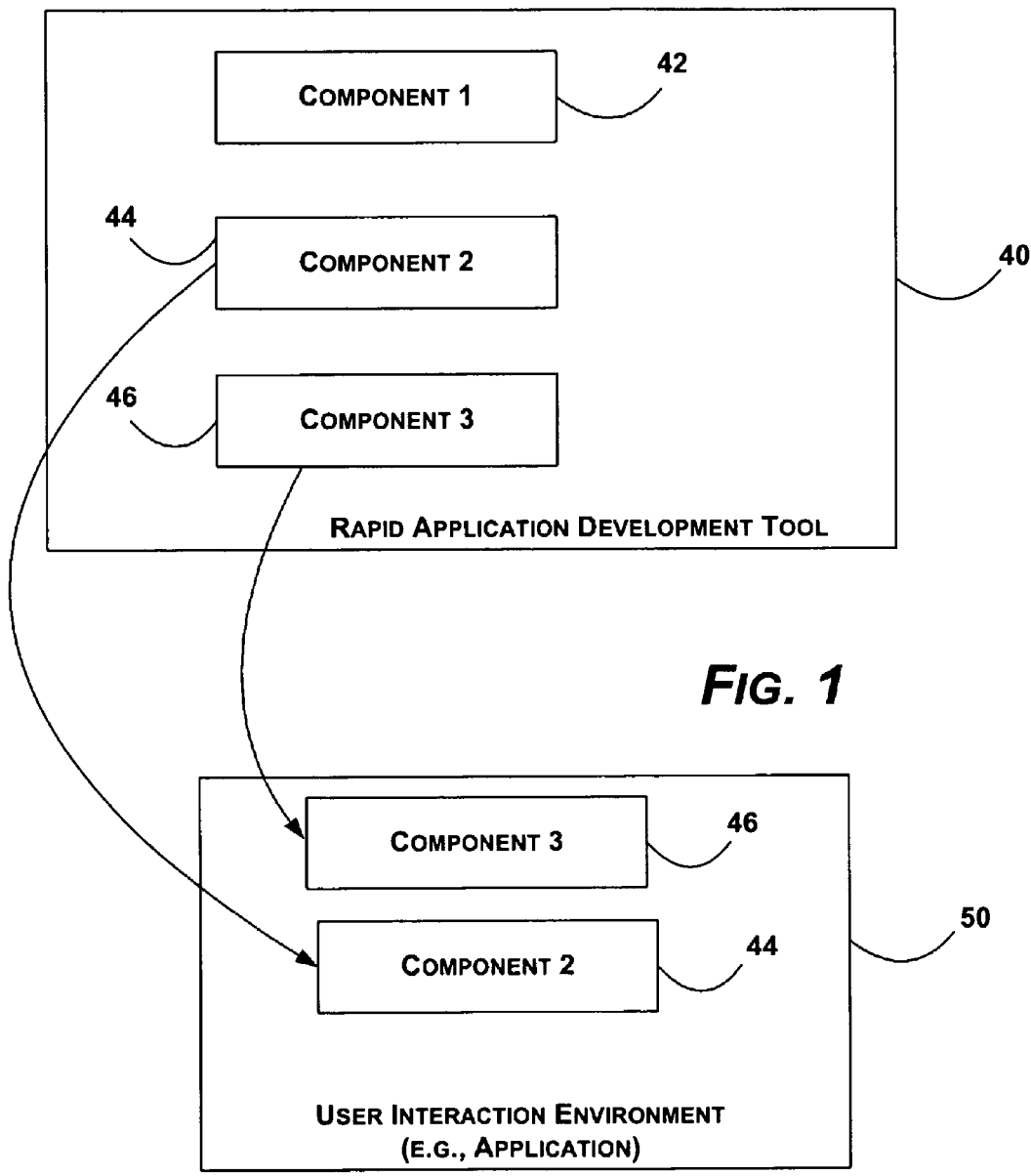
FIG. 1 is a block diagram representing components of a rapid application development tool.

Referring now to the drawings, in which like reference numerals represent like parts throughout the several views, FIG. 1 shows a rapid application development tool 40. Rapid application development tools, such as the rapid application development tool 40 shown in FIG. 1, are known. In general, rapid application development tools utilize web application frameworks or other types of software frameworks to speed application development. Prototypes or templates are provided as easily-added building blocks for user interface modules and other components of an application or another user interaction environment. A designer utilizing a rapid application development tool 40 does not have to build individual components of an application 50 or another user interaction environment, but instead can utilize readily available components 42, 44, 46 in the rapid application development tool 40. These components 42, 44, 46 may be selected for use in an application 50 via a wizard or other tool, or may be implemented using drag and drop or other methods. Each component may include several different options for display or function, as is known in the art. In the embodiment shown in FIG. 1, the user interaction environment 50 utilizes two of the components 44, 46. These components 44, 46 serve as application modules for the user interaction environment 50, and may perform different functions when rendered in the user interaction environment.

An example of a rapid application development tool is Oracle International Corporation's Application Development Framework, also called "ORACLE ADF." ORACLE ADF is a commercial Java framework for creating enterprise applications and user interaction environments.

ORACLE ADF is based upon the model-view-controller architecture, which is known and documented. See, for example, "Oracle ADF 11g Primer; Introduction to the building blocks of a Fusion Web application" (An Oracle White Paper, April 2007), incorporated herein by reference. The model-view-controller architecture isolates business logic (e.g., data) from user interface considerations, resulting in an application or user interaction environment where it is easier to modify either the visual appearance of a user interaction environment or the underlying business rules without affecting the other. In the model-view-controller architecture, the model represents the information (the data) of the application and the business rules used to manipulate that data, the view corresponds to the elements of the user interface such as text, check box items, and so forth, and the controller manages details involving the communication to the model of user actions such as keystrokes and mouse movements.

Although ORACLE ADF is provided as an example, the invention described herein may be utilized in other environments. However, for ease of description, some examples herein involves use of ORACLE ADF.

Figure 2:
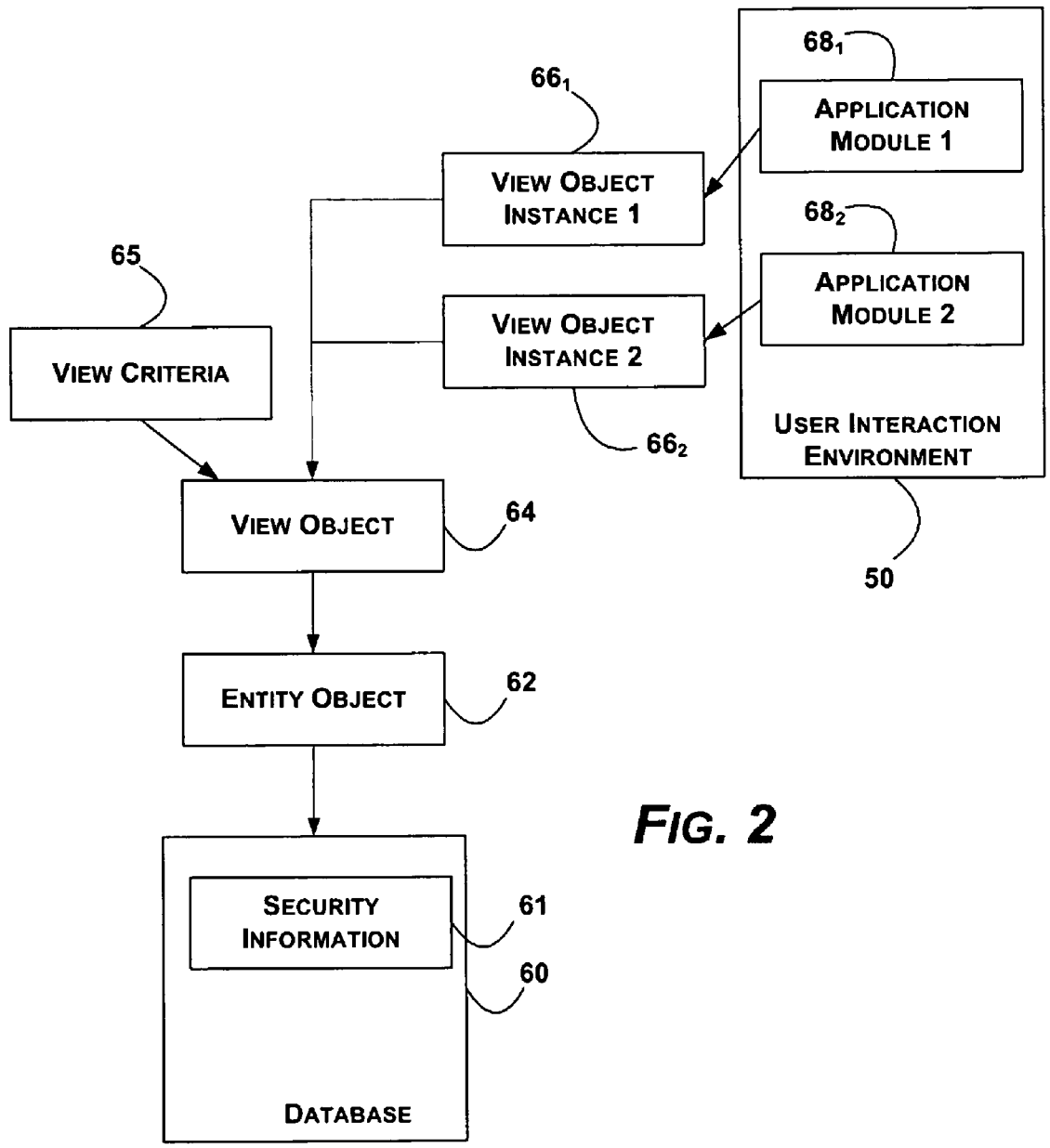
FIG. 2 is a block diagram representing a data model architecture for a user interaction environment.

FIG. 2 shows a data model architecture for a user interaction environment, such as created by ORACLE ADF, in accordance with an embodiment. A database 60 (generally the model in the model-view-controller architecture) is provided which maintains data, for example data regarding employees. Security information 61 is maintained within or is otherwise associated with the database 60. An entity object 62 represents persisted data regarding an entity, such as a person, from the database 60, and may be, for example, a row in a database table. The entity object 62 may encapsulate business logic for the row to ensure that business rules are consistently enforced.

A view object 64 (generally the view in the model-view-controller architecture) uses a query, such as a SQL query, to specify filtered subsets of business data that can be related to attributes from an entity object 62. View objects 64 are created based upon what a client needs to display. In ORACLE ADF, view objects 64 utilize parameters, called "view criteria" 65, to define data that is provided from the database 60 via the entity object 62. The views of data can be based on, but are independent of, the underlying entity objects 60, enabling flexible data retrieval to support the required user interface of the application. The view object 64 defines the attributes of the view row class, which represents a row in the query result, and optionally refers to underlying entity objects. View objects provide clients with row sets they can scroll through and update without concern for knowledge of the underlying entity objects. Clients manipulate data by navigating through the result set, getting and setting attribute values. Changes are made to the data and underlying database when a transaction is completed.

An application module 68 includes one or more view object instances 66 defined therein. These view object instances 66 may be used to bind data to the components 42, 44, 46 of the rapid application development tool 40.

Figure 3:
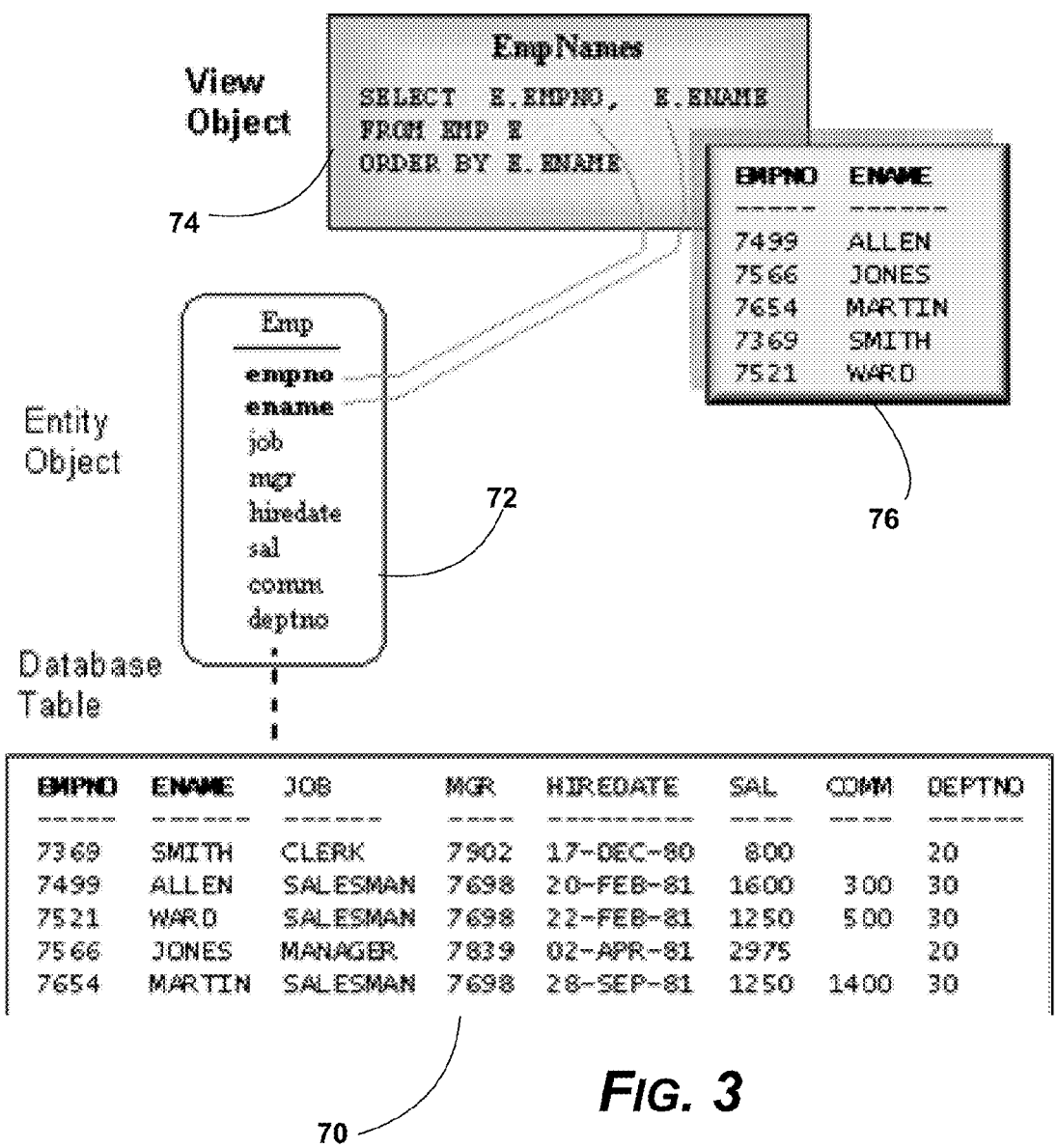
FIG. 3 is a diagrammatic representation of an example of an implementation of a data model architecture.

A specific example of a data model using entity objects and view objects is shown in FIG. 3. A database table 70 maintains information about employees, such as employee number, employee name, job, manager, hire date, and so forth. An entity object 72 created from the database table 70 may include, for example, all information about a particular employee. This information represents a row in the database table 70. The entity object may be persistent data and can be accessed by the view object 74.

In the example shown, the view object 74 named EmpNames operates on the entity object 72 to provide a view object instance 76 of the employee numbers and the employee name columns of the database table 70.

Figure 4:
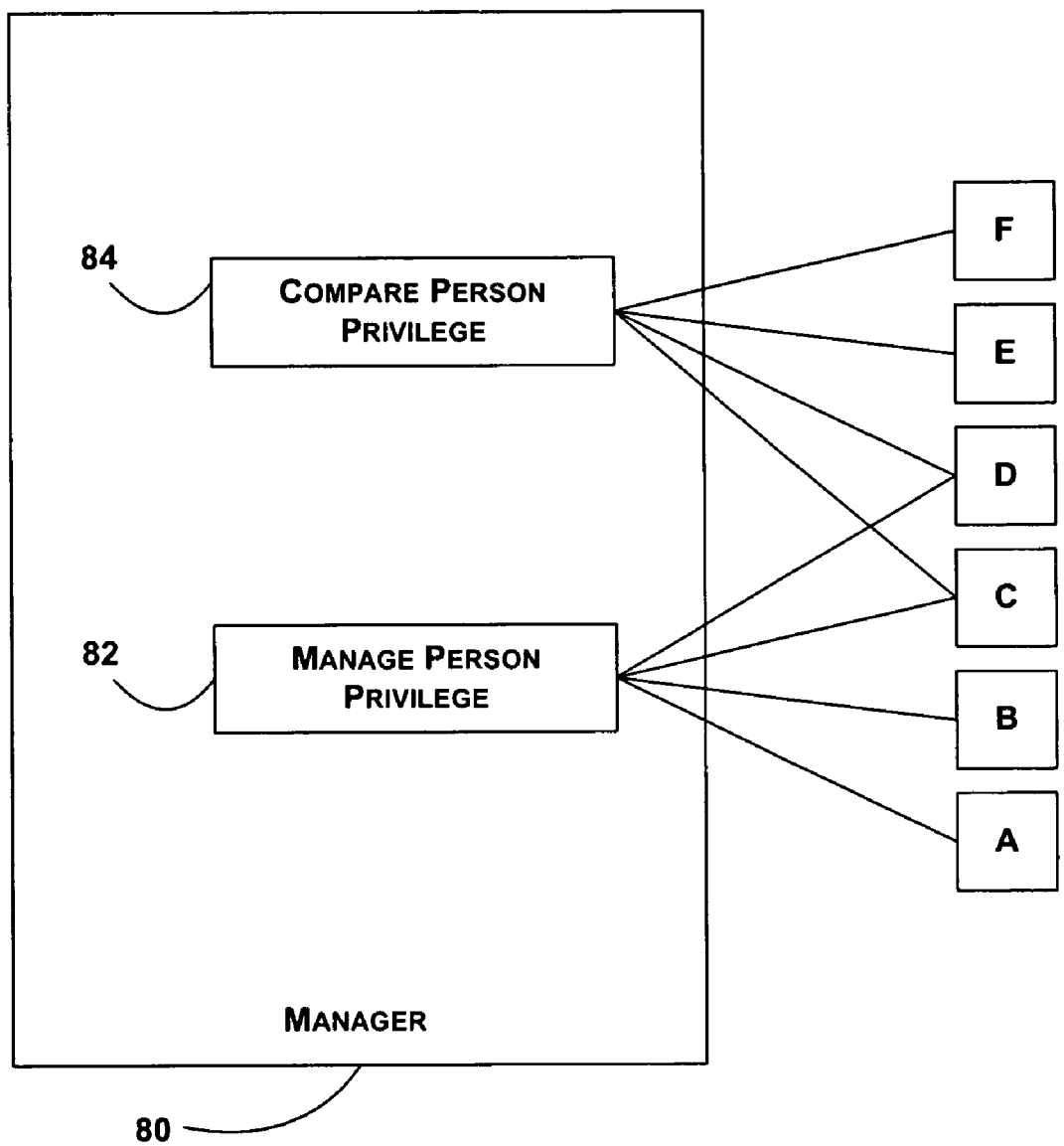
FIG. 4 is a block representation of an example of a single manager having multiple roles and different privileges with different sets of persons.

The system of FIG. 2 works well as a software architecture, but may run into problems if different levels of security are required at the components 42, 44, 46 that are bound to a single view object instance. Consider an example, shown in FIG. 4, where a single manager has two roles: a line manager and a human resources specialist. Each of these roles may have a different set of data security privileges associated with it. The human resources specialist role has the MANAGE_PERSON_DATA security privilege 82 associated with it, and the line manager role has both the MANAGE_PERSON_DATA privilege 82 and a COMPARE_PERSON_DATA security privilege 84 associated with it. Each of these privileges 82, 84 provides access to a different set of data and to a different set of persons. In accordance with manager's privileges, the MANAGE_PERSON_DATA privilege 82 provides access to persons A, B, C, and D and the COMPARE_PERSON_DATA privilege 84 provides access to persons C, D, E, and F.

A problem with this scenario is that, if data security is applied at the entity object level, then the manager 80 may have access to more data than is permitted via security privileges. If the MANAGE_PERSON_DATA privilege 82 is applied at the entity object level, then the manager 80 would have access only to persons A, B, C, and D, even for COMPARE_PERSON_DATA functions. Likewise, if the COMPARE_PERSON_DATA privilege 84 is applied at the entity object level, then the manager 80 would have access only to persons C, D, E, and F. If an aggregate privilege was applied at the entity object level that contained both MANAGE_PERSON_DATA and COMPARE_PERSON_DATA privileges 82, 84, then the manager 80 would see a union of the sets, with users A, B, C, D, E, and F. This scenario would allow the user to perform the COMPARE operation on persons A and B, in addition to C, D, E, and F, which should not be permitted under the security scenario.

In accordance with an embodiment, security privileges are linked to view object instances 66, allowing security to be set for particular application modules 68 while still using the same entity object 62. To this end, security privilege view object instances are developed that are view object instances linked to data security privileges, such as privileges maintained with the security information 61. These security privilege view object instances may be used in a manner such as the view object instances 66 shown in FIG. 2. That is, the security privilege view object instances may be used to bind data to components, such as the components 42, 44, 46, for use in a rapid application development tool, such as the rapid application development tool 40.

Figure 5:
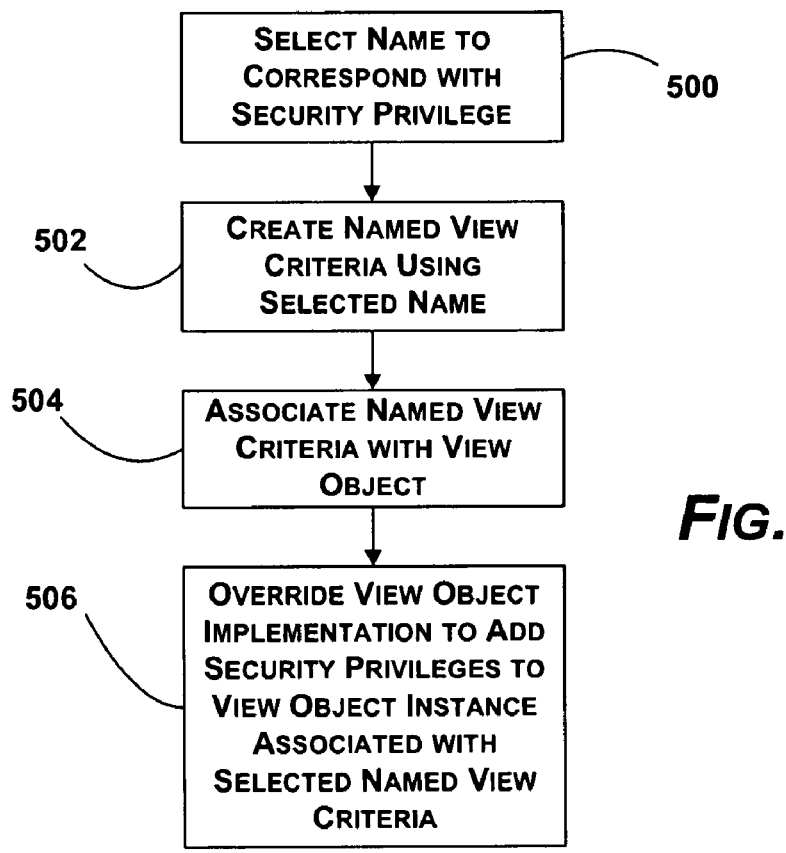
FIG. 5 is a flowchart representing steps for a designer to enable the formation and use of security privilege view object instances in accordance with an embodiment.
Figure 6:
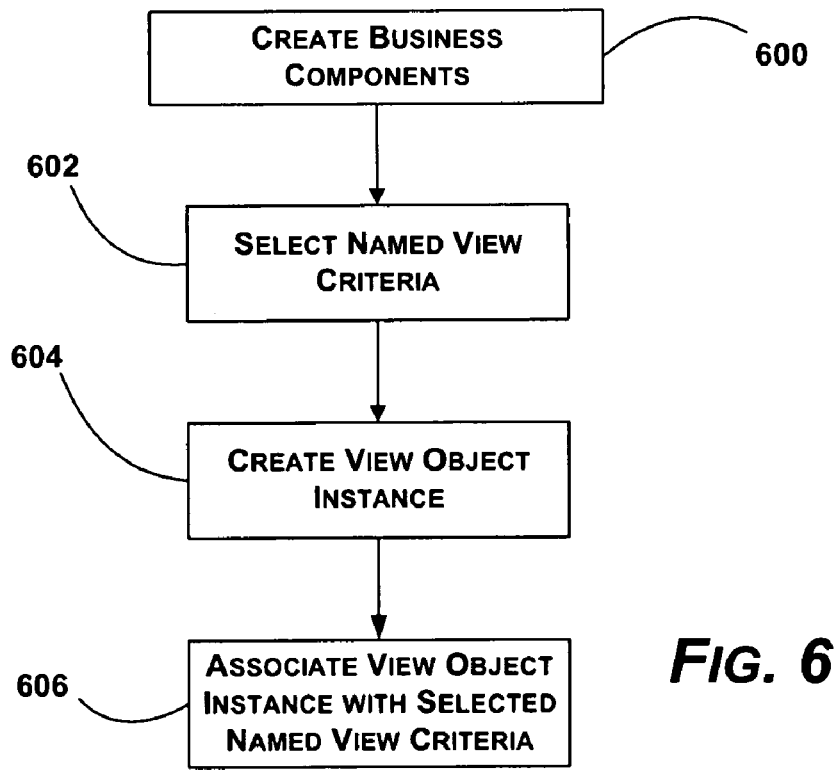
FIG. 6 is a flowchart showing steps for a developer to create a security privilege view object instance in accordance with an embodiment.

FIG. 5 is a flowchart representing steps for a designer (i.e., a person who develops the rapid application development tool 40) to enable the formation and use of the security privilege view object instances in accordance with an embodiment. Beginning at step 500, the designer selects a name to correspond (i.e., match) an associated data security privilege defined with the database 60, such as with the security information 61. These data privileges are defined in FND_GRANTS that is used to define access to data. In step 502, a named view criteria is created with the name created in step 500. In step 504, these named view criteria are associated with the view object. These named view criteria are thus available for selection and use by a developer (FIG. 6). The named view criteria are named view parameters for security privileges.

In step 506, the view object implementation is overridden such that, when a view object instance is created with one or more named view criteria, filters for security privileges are attached to the view object instance in accordance with the security privileges defined with the named view criteria. In an embodiment described below with FIG. 7, the view object implementation WHERE clause is modified to construct a predicate based upon the previously defined named view criteria. This may be done, for example, in ORACLE ADF, by overriding the GetWhereClause( ) method of the ViewObjectImpl class. The constructed predicate is configured to call to the security system, such as the security information 61, to return the appropriate WHERE clauses to filter data in accordance with set privileges.

FIG. 6 is a flowchart showing steps for creating a security privilege view object instance in accordance with an embodiment. These steps are typically performed by a developer. The developer would be a user of a rapid application development tool 40 that is creating a user interaction environment 50. The rapid application development tool 40 already has the steps performed in FIG. 5. To perform the steps in FIG. 6, a developer may utilize tools provided by the designer, such as wizards or drag and drop features. The steps assume a database 60 and related schema have already been established.

In step 600, the developer creates the business components of the system (the entity object 62, the view object 64, and the application modules 68) from database tables. At step 602, the developer utilizes a tool, such as a wizard, to select named view criteria (created in step 500). This feature permits the developer to set the privileges associated with the view object instance that is being built by selecting the appropriate named view criteria. In step 604, a view object instance is created. In step 606, the view object instance is associated with the previously selected named view criteria.

Figure 7:
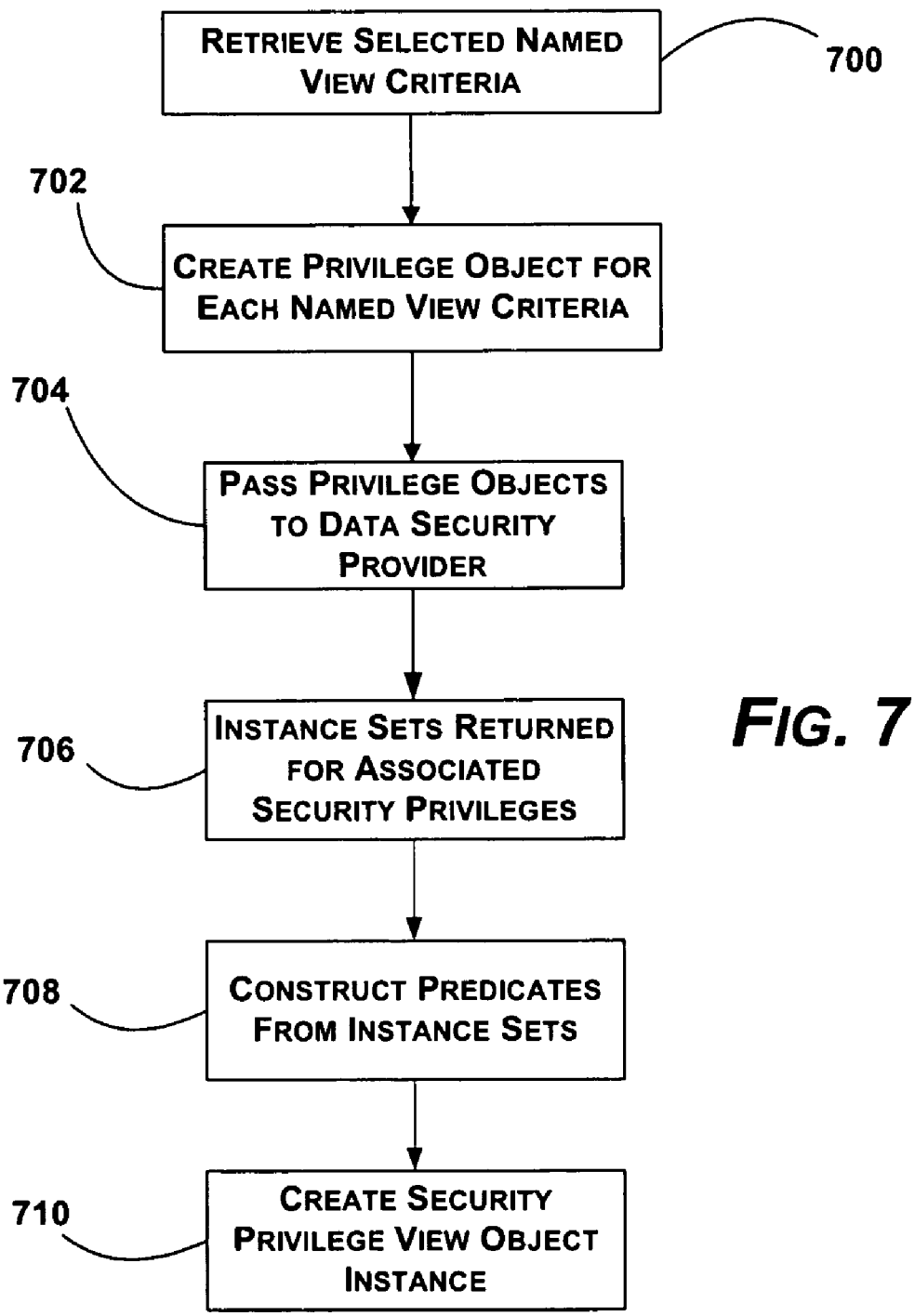
FIG. 7 is a flowchart representing steps for creating a security privilege view object instance in accordance with an embodiment.

Steps 604 and 606 may be performed by the steps of FIG. 7 in an embodiment. FIG. 7 is a flowchart representing steps for creating a security privilege view object instance with selected named view criteria in accordance with an embodiment. These steps occur as a result of the preparation by the designer (FIG. 5) and the selection by a developer (FIG. 6). In this embodiment, the view object implementation is overridden (step 506) by constructing a WHERE predicate for each security privilege associated with the selected named view criteria.

In step 700, each selected named view criteria associated in step 606 with the view object instance is retrieved. At step 702, a privilege object is created for each selected named view criteria. At step 704, information about each selected named view criteria is passed to the data security provider, such as the security information 61. This information is passed as part of the override of the getWhereClause( ) method. This may be done, for example, by passing the privilege objects created in step 702 to the data security provider, utilizing a call to the data security provider. In step 706, the instance sets for the security privileges associated with the named view criteria are retrieved. In ORACLE ADF, for steps 704 and 706, the privilege objects may be passed into a call to GetSecurityPredicate, which retrieves the associated instance sets for each privilege returned by the getWhereClause( ) method from the data security provider.

At step 708, the instance sets are used to construct the predicates. If multiple instance sets were returned, the code "ANDs" the predicates together. If no view criteria names are associated with the view object instance, the GetWhereClause( ) method may return "1=2", thus preventing any rows from being returned. This is a "secure by default" approach. At step 710, the security privilege view object instances are created. In this process, the overridden WHERE clause, now having the security predicates associated with the selected named view criteria, binds the associated security privileges to the view object instance. Thus, the view object instance has the security filters for the security privileges associated with the selected named view criteria.

The security privilege view object instances may now be used to bind data to rapid application development tool components, such as the components 42, 44, 46. These components 42, 44, 46, in turn, may be used with the rapid application development tool 40. With the security privilege view object instance, a developer utilizing the rapid application development tool 40 may drag and drop or otherwise insert the components 42, 44, 46 into an application or other user interaction environment 50, and the components may have the security privilege view object instances associated therewith. When a page is rendered containing a component bound to a security privilege view object instance, the security privilege view object instance retrieves the appropriate set of data based on the data security privileges associated with the previously selected named view criteria.

The security privilege view object instances permit different users or roles of the same user to access the same view object with different security privileges and to retrieve different sets of data. The features herein use an existing architecture in a model-view-controller environment, such as ORACLE ADF. Once created, a developer may utilize the security privilege view object instances by defining them in an application module and binding them to a component with a rapid application development tool.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method performed in a software architecture having data and a plurality of security privileges associated with the data, the method comprising:
under the control of one or more computing devices configured with executable instructions, providing a plurality of named view parameters for selection, each named view parameter corresponding to one of said plurality of security privileges; and in response to receiving a first request for instantiation of a view and association of the view with at least one of the plurality of named view parameters, applying each security privilege associated with said at least one of the plurality of named parameters to an instance of the view according to one or more first data privileges of a first role of a user such that, when the user has a second role with one or more second data privileges that allow data access additional to data access allowed by the one or more first data privileges, the additional data access of the one or more second data privileges is excluded.

2. The method of claim 1, further comprising, in response to receiving a second request for instantiation of the view and association of the view with a different at least one of the plurality of named view parameters, applying each security privilege associated with said different at least one of the plurality of named parameters to a second instance of the view.

3. The method of claim 1, wherein applying each security privilege associated with said at least one of the plurality of named parameters to an instance of the view comprises overriding a view implementation to apply said each security privilege.

4. The method of claim 3, wherein overriding the view implementation comprises constructing predicates for each said security privilege, and utilizing the predicates to apply said each security privilege.

5. The method of claim 3, wherein overriding the view implementation comprises creating a privilege object for each view parameter, and passing the privilege object to a data security provider.

6. The method of claim 5, wherein, in response to providing the privilege object, an instance set is provided, and the predicate is constructed from the instance set.

7. The method of claim 1, wherein providing a plurality of named view parameters for selection comprises utilizing a rapid application development tool.

8. A computer-readable medium having computer-executable instructions for performing the method in claim 1.

9. A computer-implemented method, comprising:
under the control of one or more computing devices configured with executable instructions,
in a model-view-controller software architecture configured to create entity objects and view objects and having a data store with security privileges associated therewith, providing a plurality of named view criteria for selection, each named view criteria corresponding to one of said plurality of security privileges; and in response to receiving a first request for instantiation of a view object and association of the view object with at least one of the plurality of named view criteria, applying each security privilege associated with said at least one of the plurality of named criteria to a view object instance according to one or more first data privileges of a first role of a user such that, when the user has a second role with one or more second data privileges that allow data access additional to data access allowed by the one or more first data privileges, the additional data access of the one or more second data privileges is excluded.

10. The method of claim 9, further comprising, in response to receiving a second request for instantiation of the view object and association of the view object with a different at least one of the plurality of named view criteria, applying each security privilege associated with said different at least one of the plurality of named criteria to a second view object instance.

11. The method of claim 9, wherein applying each security privilege associated with said at least one of the plurality of named view criteria to an instance of the view object comprises overriding a view object implementation to apply said each security privilege.

12. The method of claim 11, wherein overriding the view object implementation comprises constructing predicates for each said security privilege, and utilizing the predicates to apply said each security privilege.

13. The method of claim 11, wherein overriding the view implementation comprises creating a privilege object for each named view criteria, and passing the privilege object to a data security provider.

14. The method of claim 13, wherein, in response to providing the privilege object, an instance set is provided, and the predicate is constructed from the instance set.

15. The method of claim 9, wherein providing a plurality of named view criteria for selection comprises utilizing a rapid application development tool.

16. A computer-readable medium having computer-executable instructions for performing the method in claim 9.

17. A non-transitory computer-readable medium having computer-executable instructions for performing a method, the method comprising:
forming a user interaction environment associated with a data store, the data store having security privileges associated therewith; and
installing a view object instance in the user interaction environment, the view object instance being associated with at least one of the security privileges such that, when the view object is instantiated in the user interaction environment, the at least one security privileges is applied according to one or more first data privileges of a first role of a user such that, when the user has a second role with one or more second data privileges that allow data access additional to data access allowed by the one or more first data privileges, the additional data access of the one or more second data privileges is excluded.

18. The computer-readable medium of claim 17, wherein the method further comprises installing a second view object instance in the user interaction environment, the second view object instance being associated with at least one of the security privileges.

* * * * *